Nov. 11, 1924. 1,515,541

J. BLOOM

NONSKID CHAIN

Filed Oct. 13, 1923

Patented Nov. 11, 1924.

1,515,541

UNITED STATES PATENT OFFICE.

JEFFERSON BLOOM, OF CURWENSVILLE, PENNSYLVANIA.

NONSKID CHAIN.

Application filed October 13, 1923. Serial No. 668,434.

*To all whom it may concern:*

Be it known that I, JEFFERSON BLOOM, a citizen of the United States, residing at Curwensville, in the county of Clearfield and State of Pennsylvania, have invented new and useful Improvements in Nonskid Chains, of which the following is a specification.

This invention relates to anti-skid chains for motor operated vehicles, the invention residing in the construction of the tread rings which allow the tread chains to be arranged at proper angles with respect to the side chains and thus cooperates with said rings to offer the greatest amount of resistance to any tendency of the vehicle to skid under all conditions.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein.

Figure 1:
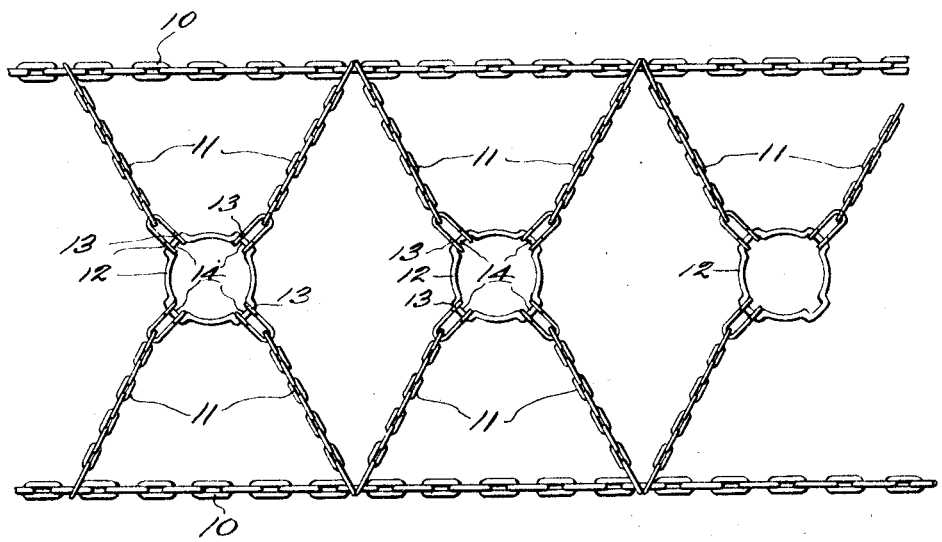
Figure 1 is a fragmentary plan view of the anti-skid device forming the subject matter of this invention.

The anti-skid device embodies the chains 10 which are commonly called side chains inasmuch as they are adapted to be arranged at opposite sides of the vehicle wheel (not shown) and adjacent the felly thereof. These side chains 10 are connected together by what I term tread chains 11, the latter being arranged in groups of four chains, having their outer terminals connected with the side chains 10, and their corresponding inner terminals associated with the tread ring 12. The final link of each tread chain 11 which is associated with the ring 12, is preferably constructed in the manner shown in Figure 3, that is, it is formed with hook like terminals 13 which can be quickly and conveniently attached to or removed from its cooperating ring 12 when the occasion may require. It will be noted upon an inspection of Figure 1 that the various groups of the tread chains are arranged side by side, so that the adjacent pair of chains of each group have their corresponding outer terminals connected to the side chains 10 at substantially the same point, and in this manner, the entire tread surface of the tire equipped with the device is provided with the tread chains to positively prevent skidding of the vehicle under all circumstances.

Figure 2:
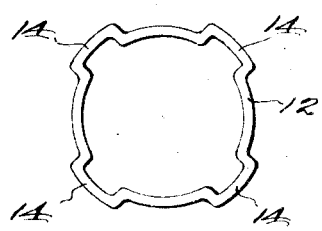
Figure 2 is an enlarged view of one of the rings above mentioned.
Figure 3:
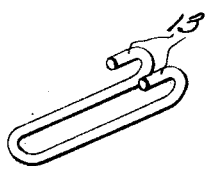
Figure 3 is a detail view of one of the links of each tread chain which connects the latter with one of the rings shown in Figure 2.

In Figure 2, I have illustrated an enlarged view of one of the tread rings 12, wherein the ring is formed at diametrically opposite points with spaced pairs of offset U-shaped portions 14, there being one of these portions for each tread chain 11, and the hook like terminals 13 of the connecting link of each chain is adapted to receive one of these portions 14. It will be noted that all of the U-shaped portions 14 of the ring lie in the same plane with the body of the ring to properly contact or engage the tread of the tire, and thus prevent injury thereto. The offset portions prevent derangement of the tread chains, by preventing the inner ends of the chains from slipping around the ring, and consequently the said tread chains are arranged at an angle with respect to the ring, their position with relation to the side chains providing the anti-skid surface for the tire which minimizes the possibility of the wheel skidding. Furthermore the hook like terminals 13 of each link shown in Figure 3 are received by one of the U-shaped portions of the ring, and by reason of the fact that these terminals bear against the parallel sides of the U-shaped portion of the ring, spreading or sliding of the particular chain with relation to the ring is obviated. Then again, the offset portions of the ring, which are arranged circumferentially about the center of the tread of the tire also prevent skidding of the wheel to a marked degree, and these offset portions thereby cooperating with the angularity of the tread chains 11 to offer a maximum resistance to the tendency of the wheel to skid under any and all circumstances. The invention in its entirety is very simple in construction and can be manufactured and sold at a nominal cost.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

Means for connecting the adjacent ends of a plurality of cross chains of an antiskid device together, said means comprising a ring formed at diametrically opposite points to provide outwardly extended portions of U-shape formation, all of said portions lying in the same plane with the body of the ring to properly contact or engage the tread of the tire and prevent injury thereto, and a substantially U-shaped connecting element connecting each of said cross chains with one of the U-shaped portions of said ring, and terminating to provide hooks to receive said portion, said hooks bearing against the parallel sides of said U-shaped portion to prevent spreading or sliding of the particular chain with relation to the ring.

In testimony whereof I affix my signature.

JEFFERSON BLOOM.